United States Patent [19]

Martin

[11] 3,989,728

[45] Nov. 2, 1976

[54] PROCESS FOR SYNTHESIZING SPECIFIC COMPLETE MIXED POLYOL ESTERS

[75] Inventor: James Bruce Martin, Hamilton, Ohio

[73] Assignee: The Procter & Gamble Company, Cincinnati, Ohio

[22] Filed: Feb. 12, 1975

[21] Appl. No.: 549,400

[52] U.S. Cl. .............................. 260/410.7; 260/403; 426/417; 260/404

[51] Int. Cl.$^2$ ........................ C11C 3/02; A23J 7/00; C09F 5/00

[58] Field of Search ............. 260/410.7, 410.8, 404, 260/403; 426/194, 417

[56] References Cited

UNITED STATES PATENTS

| | | | |
|---|---|---|---|
| 2,759,954 | 8/1956 | Miller | 260/410.7 |
| 3,175,916 | 3/1965 | Costigliola | 260/410.7 |
| 3,360,548 | 12/1967 | Clark | 260/410.7 |
| 3,410,881 | 11/1968 | Martin | 260/410.7 |
| 3,878,231 | 4/1975 | Harwood | 260/410.7 |
| 3,882,155 | 5/1975 | Wharton | 260/410.7 |

*Primary Examiner*—Winston A. Douglas
*Assistant Examiner*—John F. Niebling
*Attorney, Agent, or Firm*—Louis G. Xiarhos

[57] ABSTRACT

Reacting a partial polyol monocarboxylic acid ester with an acidic anhydride in the presence of a catalytic material selected from the group consisting of stannic chloride, ferric chloride, zinc chloride and mixtures thereof to produce specific complete mixed polyol esters, especially synthetic cocoa butter, with substantially no ester group rearrangement.

16 Claims, No Drawings

PROCESS FOR SYNTHESIZING SPECIFIC COMPLETE MIXED POLYOL ESTERS

BACKGROUND OF THE INVENTION

This invention relates to a process for synthesizing complete mixed polyol esters, that is, polyol esters having at least two different ester groups and no free hydroxyl groups. More particularly, this invention relates to a process for esterifying partial polyol esters without rearrangement of ester groups either by intermolecular or intramolecular acyl group exchange. The term "partial polyol ester" is used herein to denote a polyol which is partially, that is, incompletely, esterified and as a consequence contains at least one hydroxyl group.

In general, this process provides mixed polyol esters with specific ester groups at specific polyol hydroxyl sites. Thus, this process is especially useful for providing synthetic cocoa butter and closely related oleaginous substitutes from inexpensive raw materials such as lard, tallow, and palm oil.

Cocoa butter is unusual among naturally occurring fats in that it is normally a brittle solid up to about 77° F, has a relatively narrow melting range and is almost completely liquid at 95° F, or slightly below body temperature. These unique melting characteristics make cocoa butter suitable for use in confectionery products, especially chocolates. Such melting characteristics contribute glossy surfaces, absence of stickiness and favorable volume changes during confectionery product molding.

Because of these advantageous melting characteristics and because of the demand for the properties which cocoa butter imparts to confectionery products, large quantities of this expensive commodity are imported even when domestic fats which can be used to produce cocoa butter substitutes are in plentiful supply at much less than the cost of cocoa butter. For many years, therefore, attempts have been made to provide from readily available and cheaper fats a product that can be used to replace at least part of the cocoa butter in chocolates and other confectionery products that normally contain cocoa butter.

In this search for a synthetic cocoa butter, it has been determined that its advantageous physical characteristics are derived from the arrangement of the fatty acid substituents in its glycerides. Analytical tests have shown that cocoa butter comprises principally 1-palmitoyl-2-oleoyl-3-stearoyl glycerol, and minor amounts of triglycerides having a different order of substitution of the palmitoyl, oleoyl and stearoyl groups on the glycerol molecule. Accordingly, 1-palmitoyl-2-oleoyl-3-stearoyl glycerol would provide the desired cocoa butter substitute, were this compound readily available.

With most esterification procedures, the synthesis of such substantially pure specific triglycerides is impossible since substantial ester group rearrangement occurs during esterification of specific partial glycerides, namely, mono- and diglycerides, the synthesis of which is known in the prior art. Thus, acylation of 1,3-diglycerides with oleic acid and a conventional acid esterfication catalyst provides only a minor proportion of triglycerides having an oleoyl group at the 2-position, where this group must necessarily occur to provide the desired synthetic cocoa butter.

Feuge, Willich and Guice, the *Journal of the American Oil Chemists Society*, July, 1963, pp. 26–264, demonstrate that ester group rearrangement ordinarily occurs during the esterification of partial glycerides, and, at page 260, point out that hydrochloric, sulfuric and hydrocarbyl sulfonic acids, which are widely used as esterification catalysts, cause ester group rearrangement. Accordingly, these acid catalysts are not suitable for preparing the desired position-specific (i.e., 2-oleoyl) triglycerides for use as a cocoa butter substitute. Similarly, ester group rearrangement ordinarily occurs during esterification of partial polyol esters other than glycerides, e.g., during esterification of partial 1,2-propylene glycol esters.

One known method for synthesizing a cocoa butter substitute comprises reacting a diglyceride having palmitoyl and stearoyl groups at the 1- and 3-positions with oleoyl chloride; see U.S. Pat. No. 3,012,890. Furthermore, it is known in the prior art that, in general, acid chlorides can be used as esterifying agents for the esterification of mono- and diglycerides. The use of acid chloride esterifying agents for specific esterifications has many undesirable aspects, however. For instance, acid chloride esterifying agents are very corrosive and their use involves handling problems. Besides, hydrochloric acid, a by-product of the reaction of an acid chloride with a hydroxyl group, is difficult to remove from the oleaginous reaction product, a critical factor inasmuch as the product is to be used as a food.

U.S. Pats. No. 3,410,881 (to J. B. Martin et al., issued Nov. 12, 1968) and U.S. Pat. No. 3,337,596 (to J. M. Thompson, issued Aug. 22, 1967) disclose the use of perchloric acid as an effective catalyst for preparing a cocoa butter substitute without rearrangement of the ester groups. However, mixtures of organic compounds with perchloric acid are known to be explosive and its use in the presence of organic compounds is preferably avoided.

Other patents have described the suitability of certain catalytic agents for position-specific catalysis of partial polyol esters. Thus, U.S. Pat. No. 3,808,245 (to D. E. O'Connor et al., issued Apr. 30, 1974) describes the use of boron trifluoride while U.S. Pat. Nos. 3,809,711 and 3,809,712 (to J. J. Yetter, issued May 7, 1974) disclose the employment, respectively, of perfluoroalkyl sulfonic acid and hydrogen bromide as effective catalysts for such esterification reactions.

There is a continuing and practical application for catalytic materials which can effectively catalyze the esterification of a partial polyol ester without ester group rearrangement. These catalysts are especially desirable where they are inexpensive, readily available and readily processed without the need for expensive or elaborate handling equipment or precautions. The employment of a solid or liquid catalyst, for example, obviates the need for specialized equipment for the handling of gaseous materials and is facilitated where the catalyst is chemically stable and conveniently handled and utilized. Effective catalysis is also promoted where the catalyst is non-reactive, i.e., does not react with the reactants and is non-interfering, i.e., does not promote side or competing reactions.

It has now been found that the esterification of a partial polyol ester can be effectively catalyzed by the employment of an effective amount of a catalyst selected from the group consisting of stannic chloride, ferric chloride, zinc chloride and mixtures thereof.

It is an object of this invention to provide an improved process for synthesizing specific complete mixed polyol esters, especially specific mixed triglycerides. It is a further object to provide a process for synthesizing specific complete mixed polyol esters with substantially no rearrangement of ester groups either by intermolecular or intramolecular exchange. It is a further object herein to provide a process for synthesizing specific complete mixed polyol esters with the aid of effective but inexpensive and readily available catalysts. Still another object is the provision of a process for synthesizing specific complete mixed polyol esters without the use of an acid chloride esterifying agent. Yet another object of this invention is to provide a process for the preparation of synthetic cocoa butter. These and other objects are obtained herein as will be seen from the following disclosure.

SUMMARY OF THE INVENTION

According to this invention, it has been found that specific complete mixed polyol esters, i.e., those with specific ester groups at specific polyol hydroxyl sites, can be prepared by esterifying partial polyol esters with acid anhydrides in the presence of a catalytic amount of a catalyst selected from the group consisting of stannic chloride, ferric chloride, zinc chloride and mixtures thereof.

DETAILED DESCRIPTION OF THE INVENTION

The metallic chlorides used herein as catalysts for position-specific esterification reactions are known compounds and are commercially available materials. Suitable catalysts are those in anhydrous form which have been found to exhibit the desired position-specific catalytic activity. While hydrated forms of these metallic chlorides are available, such hydrated forms are not suited to use in the process of the present invention and the employment of anhydrous forms constitutes an essential aspect of the present invention. Thus, the catalysts useful in the process of the present invention are anhydrous compounds and include stannic chloride, iron chloride and zinc chloride. Mixtures can be employed.

The catalysts of the process of the present invention although be conveniently handled and utilized. Anhydrous ferric chloride ($FeCl_3$) and anhydrous zinc chloride ($ZnCl_2$) are solid materials which can be utilized in crystalline, granular or powdered form. Inasmuch as they are deliquescent materials, they must be handled in a manner which preserves their anhydrous state. Normally, these materials are suitably protected against moisture from the air by dissolution in a solvent. Suitable solvents are those which are compatible with the reaction system, i.e., those which will not react with the catalyst or interfere with the esterification. Anhydrous diethyl ether can be employed for this purpose, althought the suitability of other non-interfering solvents can be readily determined in known manner. Stannic chloride ($SnCl_4$), a liquid material, is converted by moisture to a crystalline pentahydrate form and, thus, should be handled in a manner which will preserve its anhydrous condition. Similarly, diethyl ether can be employed as a solvent for this purpose.

The partial polyol esters to be esterified in the manner of this invention are derived from polyols selected from the group consisting of (1) aliphatic diols where the hydroxyl groups are unsymmetrically substituted with respect to the carbon chain, or (2) aliphatic polyols containing at least three hydroxyl groups. These diols and polyols are preferably those esterified with acyl substituents derived from monocarboxylic acids containing from 8 to 22 carbon atoms, although the position-specific esterification is independent of this chain length.

Partial polyol esters derived from aliphatic diols include, for example, esters derived from 1,2-propylene glycol, 1,2-butanediol and 1,3-butanediol. Partial polyol esters derived from aliphatic polyols containing at least three hydroxyl groups include, for example, esters derived from glycerin, 1,2,4-butanetriol, erythritol, arabitol, xylitol, 1,2,6-hexanetriol, sorbitol and mannitol. The ester groups of these partial polyol esters include, for example, those derived from caprylic, capric, lauric, myristic, palmitic, stearic, oleic, linoleic, linolenic, arachidic and behenic acids.

Partial polyol esters which are preferred for use herein are partial glyceride esters including 1- and 2-monoglycerides and 1,2- and 1,3-diglycerides. The monoglyceride ester groups can be saturated or unsaturated. The diglycerides include disaturated, monoacid diglycerides, e.g., distearing; disaturated, diacid diglycerides, e.g., 1-palmitoyl-3-stearoyl glycerol, diunsaturated, monoacid diglycerides, e.g., diolein; diunsaturated, diacid diglycerides, e.g., 1-oleoyl-3-palmitoleoyl glycerol; and mono-unsaturated, monosaturated, diacid diglycerides, e.g., 1-palmitoyl-3-palmitoleoyl glycerol. The terms "diacid" and "monoacid" are used herein to denote glycerides having two different acyl substituents and one kind of acyl substituent respectively. The preparation of partial polyol esters for use in the instant process is fully described in Mattson and Volpenhein, *Journal of Lipid Research*, July, 1962, Vol. 3, No. 3, pages 281–296.

Specific partial carboxylic acid esters of 1,2-propylene glycol can also be used in the present process. Most 1-mono-fatty acid esters of 1,2-propylene glycol, such as 1-propylene glycol monostearate, can be prepared by reacting 1,2-propylene glycol with a desired fatty acid, such as stearic acid, in the presence of a catalyst, such a p-toluene sulfonic acid, and in a solvent, such as xylene, and the 1-fatty acid ester separated by fractional crystallization, for instance. 2-Mono-fatty acid esters of 1,2-propylene glycol, such as 2-propylene glycol monobehenate, can be prepared by acylation of an appropriately blocked 1,2-propylene glycol derivative, such as 1-tetrahydropyranyl propylene glycol, with an acid chloride, such as behenoyl chloride, and cleavage of the blocking group in the presence of boric acid.

The symmetrical acid lipid anhydrides which are preferred for use in esterifying the above partial polyol esters have the structural formula:

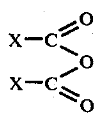

wherein each X is a substituent selected from the group consisting of:

1. alkyl and alkenyl groups containing from 7 to 21 carbon atoms and having the formula
2. residues of alkyl and alkylene half-esters of a dicarboxylic acid having the formula

3. residues of monoacyl diol half-esters of a dicarboxylic acid having the formula

4. residues of diacyl glyceride half-esters of a dicarboxylic acid having the formula

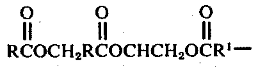

and 5. residues of monoacyl derivatives of a primary monohydroxy monocarboxylic acid having the formula

wherein in (1)–(5) above:

R is an alkyl or alkenyl group having 7 to 21 carbon atoms;

$R^1$ is an alkylene group having 2 to 4 carbon atoms;

$R^2$ is an alkylene group having 0 to 4 carbon atoms;

$R^3$ is an alkylene group having 2 to 5 carbon atoms; and

Z is a group selected from the group of hydrogen and methyl.

Another class of acid anhydrides suitable for use in the instant process are those of the formula

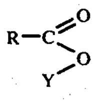

wherein R is selected from the group consisting of alkyl and alkenyl substituents having from 7 to 21 carbon atoms and Y is selected from the group consisting of benzoyl, p-nitrobenzoyl and alkyl phosphoryl substituents of the formula $(R^4O)_2P$-O wherein $R^4$ is a $C_1$ to $C_5$ alkyl or phenyl substituent. These unsymmetrical acid anhydrides are fully described in U.S. Pat. No. 3,337,596, incorporated herein by reference.

The acid lipid anhydrides in the present process can be prepared in well-known fashion by admixing the corresponding acidic lipid with an excess of acetic or propionic anhydride, cooling the reaction product, crystallizing the acid lipid anhydride and collecting the desired product by filtration. The unsymmetrical anhydrides are prepared as described in U.S. Pat. No. 3,337,596.

The most effective processes for the formation of acidic lipid anhydrides useful in this invention employ metathesis with acetic anhydride either at low temperatures, i.e., 32° to 140° F, with perchloric acid catalysis, or at higher temperature, i.e., 140° to 300° F, without perchloric acid catalysis, but with evaporation of the acetic acid formed in the reaction.

Acidic lipids for use in preparing the acidic lipid anhydrides by the above methods can be derived from a variety of sources, depending on the specific acidic lipid involved. The acidic lipids for use herein include aliphatic monocarboxylic acids, alkyl half-esters of dicarboxylic acids, monoacyl diol half-esters of dicarboxylic acids, diacyl glyceride half-esters of dicarboxylic acids, and monoacyl derivatives of primary monohydroxy monocarboxylic acids.

The monocarboxylic acids contain from 8 to 22 carbon atoms and include, for example, stearic and oleic acids. They can be readily obtained from glycerides by saponification, acidulation and isolation procedures, or by hydrolysis. The acid desired determines the choice of glyceridic material. For example, a technical grade of stearic acid can be obtained from hydrogenated soybean oil and a technical grade of oleic acid can be obtained from olive oil.

The alkyl half-esters of dicarboxylic acids are condensation products of dicarboxylic acids having from 4 to 6 carbon atoms with straight chain fatty alcohols containing 8 to 22 carbon atoms. Useful dicarboxylic acids include succinic, glutaric and adipic acids. Useful alcohols include, for example, cetyl and octadecyl alcohols. The dicarboxylic acids are advantageously condensed with the fatty alcohols in a mutual solvent such as dimethylformamide, dimethylacetamide, dioxane, xylene or toluene, either with or without the use of a catalyst such as sulfuric acid, p-toluene sulfonic acid, hydrogen chloride, zinc chloride, and other such catalysts. These preparations are best carried out with reaction temperatures in the range of from 175° to about 350° F with water being removed under reduced pressure. The desired condensation products are isolated by appropriate distillation, and/or washing, and/or crystallization treatments if such treatments are required to remove solvents, excess reactants and impurities.

The monoacyl diol half-esters of dicarboxylic acids are the reaction products of monoacyl diols and dicarboxylic acid anhydrides. The diols for use in preparing these lipids contain from 2 to 6 carbon atoms and can contain either primary or secondary hydroxy groups. Useful diols include, for example, ethylene glycol, 1,2-propylene glycol, 1,3-propanediol, 1,4-butanediol, 1,3-butanediol and 1,5-pentanediol. An excess of one of these diols is condensed with a straight chain monocarboxylic acid, containing 8 to 22 carbon atoms, such as stearic or oleic acid, in the presence of an esterification catalyst, such as sulfuric acid, and preferably with refluxing with xylene. This condensation reaction yields a monoacyl diol which in turn is reacted at a temperature ranging from 175° to 350° F with the anhydride of a dicarboxylic acid containing 4 to 6 carbon atoms such as succinic, glutaric and adipic acids, to form the desired lipid.

The diacyl glyceride half-esters of a dicarboxylic acid are reaction products of diacyl glycerides and dicarboxylic acid anhydrides. The diacyl glycerides for use in preparing these lipids contain acyl groups derived from straight chain monocarboxylic acids containing from 8 to 22 carbon atoms, such as stearic and oleic acids, and can be prepared as described in the previously referred to Mattson and Volpenhein reference. These diacyl glycerides are reacted at a temperature ranging from 175° to 350° F with the anhydride of a dicarboxylic acid containing from 4 to 6 carbon atoms, such as succinic, glutaric and adipic acids, to form the desired lipids.

The monoacyl derivatives of a primary monohydroxy-monocarboxylic acid are reaction products of monocarboxylic acid chlorides containing from 8 to 22 carbon atoms, such as stearic and oleic acid chlorides, with primary monohydroxy-monocarboxylic acids having from 3 to 6 carbon atoms. Suitable monohydroxy-monocarboxylic acids include hydracrylic, 4-hydroxybutyric, 3-hydroxypentanoic, and 6-hydroxyhexanoic acids. The desired lipids can be prepared from these acid chlorides and monohydroxy-monocarboxylic acids as described in U.S. Pat. No. 2,251,694.

The unsymmetrical anhydrides useful herein are prepared by reacting the triethylammonium salt of one acid with the acid halide of the other acid in the manner fully described in U.S. Pat. No. 3,337,596.

As previously explained, the above partial polyol esters are reacted with the above acidic lipid anhydrides in the presence of the stannic chloride, ferric chloride, zinc chloride catalyst. Normally, the partial polyol ester and acidic lipid anhydride will be reacted at a 1:1 molar ratio. In a preferred mode, an excess of the acidic lipid anhydride is employed over that required by the stoichiometry of the reaction; a 5 to 100% molar excess is preferred. The maximum amount of excess lipid anhydride is not critical and molar excesses of 10 to 20 times can be employed, particularly when the anhydride is being used as the reaction solvent, as noted below. The molar ratio of the catalyst of the invention to acid lipid anhydride should be at least about 0.001 to 1. A maximum limit of 0.50 to 1 for this molar ratio is most preferred, for economic reasons, but higher ratios can be employed.

The position-specific esterification reaction of this invention takes place over a wide range of temperatures and in the presence of a wide variety of solvents without ester group rearrangement. Reaction temperatures can range from −30° to 350° F, with 0° to 212° F being preferred. The reaction can in most cases be carried out at room temperature (ca. 70° F). It is noted that the reaction normally occurs at room temperature in a time period ranging from 1 minute to 5 hours. Thus, the reaction of this invention is very rapid when compared with esterification with acid chloride esterification agents, which at room temperature normally takes from 10 hours to 24 hours for substantial reaction completeness.

In general, the solvent, if any, can be any organic liquid medium which will form a phase sufficiently uniform so as to bring the reactants into contact. If it is a liquid, a molar excess of the acid lipid anhydride can be used as the solvent, this excess being calculated on the basis of only one acidic lipid radical of each anhydride molecule reacting. Other useful solvents include hexane, chlorinated hydrocarbons such as chloroform and carbon tetrachloride, aromatic hydrocarbons carbons such as benzene and aliphatic esters such as ethyl acetate. Still other useful solvents include aromatic heterocyclic bases such as pyridine, tertiary amides such as dimethylformamide and dimethylacetamide, heterocyclic oxides such as tetrahydrofuran, and fatty acids.

In the case where monoglycerides are the partial polyol esters, the specific solvent used seems to have some effect on whether substantially no ester group rearrangement occurs; benzene and pyridine are desirably used as solvents in this case.

Turning now to one specific application of the above-described general process, that is, a process for preparing synthetic cocoa butter, it has been found that certain 1,3-diglycerides can be esterified with oleic acid anhydride by the above-described general method to provide synthetic cocoa butter. This process is illustrated by the following equation:

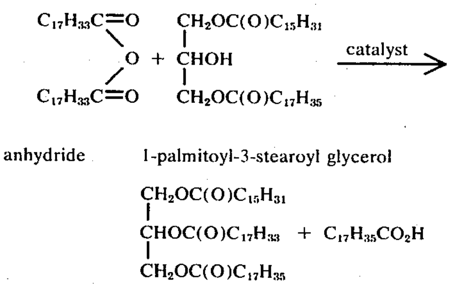

Oleic anhydride — 1-palmitoyl-3-stearoyl glycerol 1-palmitoyl-2-oleoyl-3-stearoyl glycerol Although the stoichiometry of the reaction indicates that at a 1:1 molar ratio of acid anhydride:polyol two moles of acid are present, the second mole of acid is not involved in the esterification since it is not in the anhydride form. Of course, anhydride:polyol mole ratios of less than 1:1 can be used herein, but this results in proportionate amounts of unesterified polyol in the product.

The 1,3-diglycerides used in this process can be obtained by superglycerination of lard or of substantially completely hydrogenated palm oil in the presence of triacetin using the method of Baur and Lange, *Journal of the American Chemical Society*, 1951, vol. 73, page 3926.

The following examples illustrate the preparation of synthetic cocoa butter in greater detail, but are not to be construed in any way as limiting the scope of the invention. Unless otherwise specified, all percentages in the following examples are by weight.

EXAMPLE I

Synthetic Cocoa Butter Preparation

Part I. Synthesis of 1,3-Diglyceride Mixture

Three hundred and four grams of palm oil hydrogenated to an iodine value of 8 and having an acid value of 0 are reacted with 157 grams of water-washed and distilled triacetin in the presence of 26 ml. of sodium methoxide catalyst in the form of a Xylene suspension (0.09 gm. sodium methoxide per ml. xylene) at 195° F with stirring for 1.5 hours. At this point, 58 grams of dry glycerol are added; heating and stirring are continued for one more hour. The reaction mixture is then allowed to cool with stirring and is stored at room temperature for 2 days.

Undesirable components are then removed from the reaction mixture by the following purification procedure: the solid mass resulting after the 2-day storage is slurried with 30 ml. of aqueous acetic acid solution containing 50% water by volume. The slurry is dissolved in 4 liters of ethanol-hexane solution (50% ethanol by volume) and the resulting solution cooled to 50° F. This temperature is maintained for a 4-hour period, during which time crystals are formed. At the end of the 4-hour period, the crystals are separated by vacuum filtration and recrystallized overnight from 3 liters of ethanol-hexane solution (50% ethanol by volume). The crystals recovered by filtration are dissolved in 1 liter of ethyl ether and water-washed three times. The ether is removed by evaporation and the residue crystallized from 2.5 liters of ethanol-hexane solution (50% ethanol by volume) at 50° F. After filtration the crystals are air-dried to provide the substantially pure product.

Analysis of the above product shows it to be substantially all 1,3-diglyceride containing palmitoyl and stearoyl groups. The above product has a hydroxyl value of 90–92 as compared to a theoretical value of 94.2 for 100% diglyceride and contains less than 0.5% monoglycerides. It has a complete melting point of 159° to 160° F. Analysis for specific acid groups shows the presence of ca. 35% palmitic and ca. 65% stearic, and minor amounts of myristic, all by weight with each acid group expressed as the corresponding acid.

Oleic anhydride is prepared by refluxing 100 grams of oleic acid in 300 grams of acetic anhydride for 3 hours. The bulk of the distillable material present, mostly acetic acid, is then removed at atmospheric pressure. The residue is then heated at 355° F under 1 to 2 mm. Hg. pressure for 30 minutes to distill the remaining volatile impurities.

Part II. Reaction of 1,3-Diglyceride Mixture and Oleic Anhydride

Twenty-four grams of the 1,3-diglyceride mixture prepared as described in Part I (and comprising: about 45% 1-palmitoyl-3-stearoyl glycerol; 42% 1,3-distearoyl glycerol; about 11% 1,3-dipalmitoyl glycerol; and the balance mixed 1,3-diglycerols) are admixed with 28 g. of a 95:5 by weight mixture of oleic anhydride and oleic acid and 24 g. hexane. The reaction mixture is stirred and heated to 130° F. Fifteen milliliters of a saturated solution of ferric chloride in anhydrous diethyl ether are added with stirring to the mixture. After 20 minutes, the reaction mixture is quenched by the addition of an equal volume of water and the reaction mixture heated to 180° F for 1 hour to hydrolyze excess oleic anhydride. The water is removed by decantation and discarded. The remaining fat (triglyceride and fatty acid) is washed once with clean water to remove any remaining catalyst. The fat is then refined as follows: The fat is dissolved in 100 ml. of 50/50 (volume) hexane/ether solution. The resulting solution is washed three times with 125 ml. (total of 375 ml.) of 6% potassium carbonate solution in 70/30 (volume) mixture of water and ethyl alcohol. The fat-containing phase is then washed with 125 ml. of 70/30 (volume) mixture of water/ethyl alcohol. The remaining fat is dried by adding acetone and vacuum distilling water, acetone and remaining solvent. The refined glyceride residue is shown to be essentially 100% triglyceride product with only a trace of free fatty acid.

Analysis for 2-position fatty acids by thin layer chromatography utilizing argentation chromatography shows that the synthetic triglyceride product of Example I contains about 88% by weight of the symmetrical monounsaturated triglyceride and the ratio of 2-position mono-unsaturation to terminal mono-unsaturation is about 30:1. The minor amount of terminal mono-unsaturation is believed to result from a residual content of 1,2-disaturated glyceride present in the 1,3-diglyceride mixture as a consequence of imperfect separation. It can be seen, however, that little, if any, ester group rearrangement occurs in this process.

The above procedure is carried out at 0° and 212° F (pressure vessel), respectively, and equivalent results are obtained.

In the above procedure, the oleic anhydride is replaced by an equivalent amount of oleic-benzoic anhydride, oleic-p-nitrobenzoic anhydride and oleic-ethylphosphoryl anhydride, respectively, and the synthetic cocoa butter 2-oleoyl triglycerides are secured in each instance.

The above procedure is carried out using mole ratios of ferric chloride to acidic lipid anhydride of 0.01:1 with equivalent results.

EXAMPLE II

Synthetic Cocoa Butter Preparation

Twenty-four grams of the 1,3-diglyceride mixture prepared as described in Part I of EXAMPLE I are admixed with 28 g. of a 95:5 by weight mixture of oleic anhydride and oleic acid and 24 g. hexane. The reaction mixture is stirred and heated to 130° F. One-half gram of anhydrous stannic chloride (a liquid at room temperature) is added with stirring to the mixture. After 20 minutes, the reaction mixture is quenched by the addition of an equal volume of water and the reaction mixture heated to 180° F for 1 hour to hydrolyze excess oleic anhydride. The water is removed by decantation and discarded. The remaining fat (triglyceride and fatty acid) is washed once with clean water to remove any remaining catalyst. The fat is then refined as follows: the fat is dissolved in 100 ml. of 50/50 (volume) hexane/ether solution. The resulting solution is washed three times with 125 ml. (total of 375 ml.) of 6% potassium carbonate solution in 70/30 (volume) mixture of water and ethyl alcohol. The fat-containing phase is then washed with 125 ml. of 70/30 (volume) mixture of water/ethyl alcohol. The remaining fat is dried by adding acetone and vacuum distilling water, acetone and remaining solvent. The refined glyceride residue is shown to be about 96% by weight triglyceride product.

Analysis for 2-position fatty acids by thin layer chromatography utilizing argentation chromatography shows that the synthetic triglyceride product of Example II contains about 85% by weight of the symmetrical monounsaturated triglyceride and the ratio of 2-position mono-unsaturation to terminal mono-unsaturation is about 28:1. The minor amount of terminal mono-unsaturation is believed to result from a residual content of 1,2-disaturated glyceride present in the 1,3-diglyceride mixture as a consequence of imperfect separation. It can be seen, however, that little, if any, ester group rearrangement occurs in this process.

EXAMPLE III

Synthetic Cocoa Butter Preparation

Twenty-four grams of the 1,3-diglyceride mixture prepared as described in Part I of EXAMPLE I are admixed with 28 g. of a 95:5 by weight mixture of oleic anhydride and oleic acid and 24 g. hexane. The reaction mixture is stirred and heated to 130° F. Eight-tenths gram of anhydrous zinc chloride partially dissolved in anhydrous diethyl ether is added with stirring to the mixture. After 20 minutes, the reaction mixture is quenched by the addition of an equal volume of water and the reaction mixture heated to 180° F for 1 hour to hydrolyze excess oleic anhydride. The water is removed by decantation and discarded. The remaining fat (triglyceride and fatty acid) is washed once with clean water to remove any remaining catalyst. The fat is then refined as follows: The fat is dissolved in 100 ml. of 50/50 (volume) hexane/ether solution. The resulting solution is washed three times with 125 ml. (total of 375 ml.) of 6% potassium carbonate solution in 70/30 (volume) mixture of water and ethyl alcohol. The fat-containing phase is then washed with 125 ml. of 70/30 (volume) mixture of water/ethyl alcohol. The remaining fat is dried by adding acetone and vacuum distilling water, acetone and remaining solvent. The refined glyceride residue is shown to be about 98% by weight triglyceride product with only a trace of free fatty acid.

Analysis for 2-position fatty acids by thin layer chromatography utilizing argentation chromatography shows that the synthetic triglyceride product of EXAMPLE III contains about 90% by weight of the symmetrical monounsaturated triglyceride and the ratio of 2-position mono-unsaturation to terminal mono-unsaturation is about 90:1. The minor amount of terminal mono-unsaturation is believed to result from a residual content of 1,2-disaturated glyceride present in the 1,3-diglyceride mixture as a consequence of imperfect separation. It can be seen, however, that little, if any, ester group rearrangement occurs in this process.

EXAMPLE IV

Esterification of 1,3-Dipalmitin With Oleic Anhydride

Twenty grams of 1,3-dipalmitin made as described in Example 2 of U.S. Pat. No. 2,626,952 and 30 ml. of oleic anhydride made as in Example I herein are admixed in 50 ml. of water-washed, distilled and dried chloroform in the presence of 1.8 grams of anhydrous ferric chloride. The reactants are stirred at room temperature for 3 hours.

The reaction mixture is dissolved in 500 ml. ethyl ether together with 100 ml. water. The ether phase is water-washed three times, dried and evaporated in an inert atmosphere. The residue is crystallized twice from acetone at 20° F and the crystals dried to provide substantially pure triglyceride product.

The product has an acid value of ca. 0.8 and a hydroxyl value of 2,0, showing that substantially all the product is triglyceride. The triglyceride is found to contain 90 –95% by weight oleic acid at the 2-position, i.e., 1-palmitoyl-2-oleoyl-3-palmitoyl glycerol, demonstrating that substantially no existing ester group rearrangement occurs during the above esterification reaction.

In the above procedure the 1,3-dipalmitin is replaced by an equivalent amount of 1,3-distearoyl glycerol, 1-palmitoyl-3-stearoyl glycerol, 1-palmitoyl-3-lauroyl glycerol and 1-behenoyl-3-stearoyl glycerol, espectively, and the corresponding 2-oleoyltriglycerides are formed without ester group migration.

In the above procedure the chloroform is replaced by an equivalent amount of carbon tetrachloride, benzene and hexane, respectively, and equivalent results are secured.

The above procedure is repeated using an equivalent amount of 1,2-dipalmitin as the partial glyceride and 1-oleoyldipalmitin is secured, demonstrating that essentially no ester group rearrangement occurs with the ferric chloride catalyst herein.

EXAMPLE V

Esterification of 1,3-dipalmitin with Rapeseed Oil Fatty Acid Anhydride

Rapeseed oil fatty acid anhydride is formed as follows: rapeseed oil is hydrolyzed to the corresponding rapeseed oil fatty acids. These fatty acids are formed into the corresponding long chain fatty acid anydrides by the anhydride-forming process disclosed in Example I. The anhydrides so formed are for the most part mixed anhydrides, that is, each anhydride molecule contains two different fatty acid groups. These anhydrides react in the same manner as if each molecule contains two identical fatty acid groups.

Two grams of rapeseed oil fatty acid anhydride, 1.5 grams of 1,3-dipalmitin prepared as in Example IV, 10 ml. purified chloroform and 0.45 gram anhydrous ferric chloride are reacted together with mixing at room temperature (ca. 70° F) for one hour. The reaction product is diluted with 100 ml. ethyl ether, water-washed and the solvent evaporated in an inert atmosphere. The residue is crystallized three times from 75 ml. acetone at 20° F to provide the purified product.

Thin layer chromatography shows that substantially all the product is triglyceride. Analysis of the triglyceride and comparison of the 2-position fatty acid composition of the triglyceride with the original rapeseed oil fatty acids indicates that the palmitic, stearic, oleic, palmitoleic, linoleic, linolenic and erucic acid fractions of the rapeseed oil each esterify the 1,3-dipalmitin at the 2-position with substantially no acyl group migration.

EXAMPLE VI

Esterification of 2-monostearin

One-half gram of 2-monostearin made by the process described in Martin, *Journal of the American Chemical Society*, 1953, vol. 75, page 5482, 1.84 grams oleic anhydride made as in Example I, 10 ml. benzene and 0.15 gram anhydrous zinc chloride dissolved in diethyl ether are reacted together with mixing at 70° F for 3 hours.

The reaction mixture is diluted with ethyl ether, water-washed and the solvent removed by evaporation. The residue is crystallized twice from 20 ml. acetone at 20° F. Substantially all the product is 2-stearoyldiolein; therefore, substantially no existing ester group rearrangement occurs during the esterification reactions.

In the above procedure, the benzene solvent is replaced with an equivalent amount of pyridine with equivalent results.

EXAMPLE VII

Esterification of 1-monostearin with stearoyl propylene glycol succinate anhydride Forty-four grams (0.1 mole) of stearoyl propylene glycol hydrogen succinate are mixed with 30 grams (0.3 mole) of acetic anhydride and heated at reflux for 1 hour. The mixture is then heated at 250° to 265° F for 2 hours under a pressure of 2–5 mm. Hg. The residue is cooled with recovery of about a 96% yield of stearoyl propylene glycol succinate anhydride (an anhydride having the previously described structural formula wherein X is a residue of a monoacyl diol half-ester of a dicarboxylic acid).

Three and six-tenths grams of 1-monostearin (0.01 mole) prepared by the process described in Mattson and Volpenhein, *Journal of Lipid Research*, July 1962, vol. 3, No. 3, pp. 283, 284, is dissolved in 144 ml. benzene with slight warming. Nineteen grams (0.022 mole) of the above prepared stearoyl propylene glycol succinate anhydride is added with stirring. The sample is treated with 0.29 gram anhydrous stannic chloride catalyst and stirring continued at 90° F for 1 hour.

The reaction mixture is diluted with 100 ml. water and the mixture shaken in a separatory funnel. The washed benzene solution is dried and the product isolated by chromatography on a 300 gram silica gel (+ 5% water) column. Elution with 1 liter of benzene and with one liter of benzene containing 2% ethyl ether and 1% acetic acid yields about 11 grams of product. Fractional crystallization of the product from 15 volumes of acetone at 70°, 50° and 0° F provides a product comprising 90% 1-stearoyl-2,3-di(stearoyl propylene glycol succinyl) glycerol having the structural formula

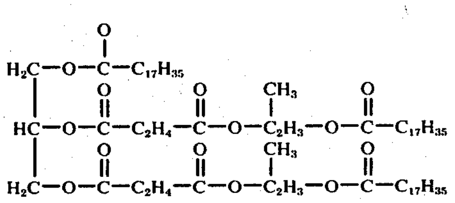

Substantially no existing ester group rearrangement occurs during the above esterification reaction.

EXAMPLE VIII

Esterification of 1,3-distearin with octadecyl glutarate anhydride

Octadecyl glutarate anhydride (an anhydride having the previously described structural formula wherein X is a residue of an alkyl half-ester of a dicarboxylic acid) is prepared the same as the anhydride in Example VII but with substitution of a molar equivalent of octadecyl hydrogen glutarate for the stearoyl propylene glycol hydrogen succinate.

Six and two-tenths grams distearin prepared as in Example I of U.S. Pat. No. 2,626,952 are dissolved in 120 ml. benzene with stirring and slight warming. Seven and nine-tenths grams of the above octadecyl glutarate anhydride are added; when the reagents are completely dissolved, 0.18 gram of anhydrous ferric chloride is added. The mixture is then stirred at room temperature for 1 hour.

The reaction mixture is diluted with 100 ml. water and the aqueous layer separated and discarded. The benzene layer is washed twice with water, dried with 5 grams sodium sulfate, filtered and evaporated to dryness. The residue is crystallized from 200 ml. acetone. The crystals are recrystallized from 150 ml. acetone to provide 95% pure 1,3-distearoyl-2-octadecyl glutaryl glycerol. Substantially no existing ester group rearrangement occurs during the above esterification reaction.

EXAMPLE IX

Esterification of 1,3-distearin with 1,3-distearin-2-succinate anhydride 1,3-distearin-2-succinate anhydride (an anhydride having the previously described structural formula wherein X is a residue of a diacyl glyceride half-ester of a dicarboxylic acid) is prepared the same as the anhydride in Example V but with substitution of a molar equivalent of 1,3-distearin-2-hydrogen succinate for the stearoyl propylene glycol hydrogen succinate.

Six and two-tenths grams 1,3-distearin are dissolved in 250 ml. benzene with stirring and slight warming. Fifteen grams of the above 1,3-distearin-2-succinate anhydride are added and dissolved with stirring. When the reagents are completely dissolved, 0.31 gram of anhydrous zinc chloride dissolved in diethyl ether is added and the reaction mixture stirred at 100° F for 1 hour.

In order to purify the product, 100 ml. water are added and the aqueous phase separated and discarded. The product is further purified by treatment with three 30-gram portions of base-form ion exchange resin. The benzene solution is evaporated and the residue crystallized from 200 ml. acetone to provide pure di(1,3-distearin) succinate. Substantially no existing ester group rearrangement occurs during the above esterification reaction.

EXAMPLE X

Esterification of propylene glycol monooleate with stearoyl-4-hydroxybutyric anhydride One mole 1,2-propylene glycol is reacted with 0.5 mole oleic acid in 1 liter of xylene in the presence of 0.01 mole of p-toluene sulfonic acid catalyst. The sample is refluxed under a moisture trap for 2 hours, poured into ice water, water-washed and solvent-evaporated to provide 70% pure propylene glycol monooleate. The impure product is purified with a silica gel column to provide about 0.35 mole of substantially pure propylene glycol monooleate. The propylene glycol monooleate is present as a mixture of isomeric esters with 80% of the oleoyl groups at the primary hydroxyl position and 20% at the secondary position of 1,2-propylene glycol.

Stearoyl-4-hydroxybutyric anhydride (an anhydride having the previously described structural formula wherein X is a residue of a monoacyl derivative of a primary monohydroxy monocarboxylic acid) is prepared the same as the anhydride in Example VII but with substitution of a molar equivalent of stearoyl-4-hydroxybutyric acid for the stearoyl propylene glycol hydrogen succinate.

Three and four-tenths grams of the above propylene glycol monooleate are dissolved in 100 ml. benzene. Ten grams of the above stearoyl-4-hydroxybutyric anhydride are added to the solution and stirred with slight warming until dissolution is complete. When the reagents are completely dissolved, 0.29 grams anhydrous stannic chloride is added and stirring continued at 70° F. for 1 hour.

In order to purify the desired product, the reaction mixture is diluted with 100 ml. water and the aqueous phase is separated and discarded. The benzene layer is evaporated to dryness and the residue is dissolved in 100 ml. hexane. The hexane solution is crystallized at 50° F. to yield primarily stearoyl-4-hydroxybutyric acid. The filtrate from the 50° F. crystallization is evaporated to dryness and this residue is dissolved in 200 ml. acetone. The acetone solution on crystallization at 40° F. provides oleoyl (stearoyl-4-hydroxybutyryl) propylene glycol. The product consists of a mixture of isomeric esters with 80% by weight of the oleoyl groups at the primary hydroxyl position and 20% at the secondary hydroxyl position of 1,2-propylene glycol. This mixture of isomers results from the fact that the propylene glycol monooleate used consists of an 80–20 mixture of primary and secondary esters respectively. Thus, substantially no existing ester group rearrangement occurs during the above esterification reaction.

EXAMPLE XI

Esterification of 1-propylene glycol monobehenate with oleic anhydride 1-propylene glycol monobehenate is made as follows: ethyl lactate (450 grams, 3.8 moles) is mixed with 1.2 ml. concentrated hydrochloric acid and the mixture cooled in an ice bath. Dihydropyran (420 grams, 4.9 moles) is added with stirring, after which the sample is allowed to warm to room temperature. After 3 hours, 10 grams of potassium carbonate are added and the sample stirred. The product is distilled under reduced pressure with collection of 366 grams tetrahydropyranyl ethyl lactate boiling at 65° to 70° C. at 1–2 mm. pressure. Tetrahydropyranyl ethyl lactate (82 grams, 0.46 mole) is dissolved in 300 ml. tetrahydrofuran and the solution is cooled in an acetone-ethanol dry ice bath. The THP ethyl lactate solution is added slowly to a 10% lithium aluminum hydride solution and subsequently the mixture is warmed to room temperature. The reactants are diluted with 150 ml. ethanol, followed by 2 liters of water. The sample is then extracted three times with 400 ml. portions of benzene. The benzene extracts are dried with sodium sulfate, filtered, and the filtrate is distilled with collection of the fraction boiling at 78–81° C at 3 mm. pressure. The yield is 28 grams of 2-tetrahydropyranyl propylene glycol.

2-Tetrahydropyranyl propylene glycol (16.0 grams, 0.1 mole) is interesterified with 39 grams methyl behenate using 4 ml. of 40% trimethyl benzyl ammonium methoxide as a catalyst. The reactants are stirred in a 250 ml. flask heated at 60–80° C. under a reduced pressure of 200 mm. Hg for 6 hours. The reactants are poured into 600 ml. of hexane and the hexane solution washed with 400 ml. of 1% potassium bicarbonate solution. The washed hexane layer is diluted with 200 ml. ethanol and 75 grams urea are added to the sample, Adduct formation with urea is accomplished by stirring the sample initially at 40° C. and allowing the mixture to cool at 25° C. during a 2 hour interval. The urea adduct is removed by filtration and discarded. The adduction with urea is repeated using 60 grams urea. The filtrate from the second urea adduction is water-washed three times and the hexane layer is evaporated to dryness. The residue is dissolved in 300 ml. hexane and the solution is crystallized at −18° C. Filtration at −18° C yields 21.3 grams of 1-behenoyl-2-tetrahydropyranyl propylene glycol. 1-Behenoyl-2-tetrahydropyranyl propylene glycol (8 grams, 0.0165 mole) is cleaved by reaction with 11 ml. of 1.6 molar boric acid in trimethyl borate. The reactants are heated in a boiling water bath with application of vacuum. Heating is continued for 15 minutes with a vacuum of 2–5 mm. Hg pressure during the final 10 minutes. The residue is cooled to room temperature and dissolved in 200 ml. ethyl ether and water-washed three times. The ether phase is dried with sodium sulfate, and evaporated to dryness on an evaporator without warming above 30° C. The residue is dissolved in 100 ml. petroleum ether and crystallized at 70° F. The crystals recovered at 70° F. are recrystallized from 200 ml. petroleum ether at 50° F. to yield ca. 5 grams of 1-propylene glycol monobehenate.

Five grams of the above prepared 1-propylene glycol monobehenate are dissolved in 100 ml. benzene together with 6 grams oleic anhydride made as in Example I. The sample is stirred at room temperature until solution is complete. The catalyst, anhydrous ferric chloride is added (0.18 gram) and the sample stirred for 30 minutes at room temperature.

In order to purify the product 100 ml. water are added and the aqueous phase separated and discarded. The benzene solution is evaporated to dryness and the residue dissolved in 100 ml. acetone. The acetone solution is crystallized at 0° F. with recovery of 95% pure 1-benenoyl-2-oleoyl propylene glycol. Substantially no existing ester group rearrangement occurs during the above esterification reaction.

EXAMPLE XII

Esterification of 1,4-distearoyl erythritol with oleic anhydride

One mole erythritol is reacted with two moles methyl stearate in 1 liter of dimethylacetamide in the presence of 0.1 mole sodium methoxide catalyst. The reaction mixture is heated at 100–120° C under reduced pressure (80–100 mm. Hg) for three hours with slow distillation of solvent such that about 400 ml. of solvent is removed in the 3-hour period. Twenty c.c. of 50% by volume aqueous acetic acid are added to the sample and this mixture poured into 2 liters of water. One liter of an ethyl acetate-butanol mixture (four parts by volume ethyl acetate to one part by volume butanol) is added. The ethyl acetate-butanol layer is separated, water-washed twice and treated with 500 grams urea. This mixture is stirred at room temperature for 2 hours. The mixture is then filtered and 0.12 mole of 1,4-distearoyl erythritol is recovered from the urea adduct by dissolving in acetone and crystallizing at 90° F.

Six and one-half grams of the above 1,4-distearoyl erythritol are dissolved in 200 ml. ethyl acetate with slight warming while stirring. Six and six-tenths grams oleic anhydride are prepared as in Example I are added, followed by 0.15 gram of anhydrous zinc chloride dissolved in diethyl ether. The reaction mixture is stirred at room temperature for 1 hour.

In order to purify the product, the reaction mixture is washed three times with water and the ethyl acetate solution dried with 15 grams of sodium sulfate and filtered. The solution after crystallizing 24 hours yields substantially pure 1,4-distearoyl-2, 2-dioleoyl erythritol. Substantially no existing ester group rearrangement occurs during the above esterification reaction.

EXAMPLE XIII

Esterification of 1,3-dipropanoyl glyceryl with acetic anhydride

One mole of 1,3-dipropanoyl glycerol is admixed with two moles of acetic anhydride and dissolved therein with heating and stirring at a temperature of about 175° F. 0.5 mole of anhydrous ferric chloride is admixed with the reaction solution and the temperature is restored to room temperature (70° F) over a 2 hour period. The reaction mixture is poured into 1 liter of water which serves to hydrolyze the unreacted acetic anhydride.

Excess water is removed by vacuum evaporation at about 90° F. on a rotary evaporator, which process also removes much of the acetic acid. The resulting residue left after evaporation is dissolved in a 1:1 mixture of ethyl alcohol and benzene and a 1.0M solution of barium chloride is added thereto, portionwise, until precipitation of the insoluble barium acetate monohydrate is complete. The solids are removed by filtration and the benzene-alcohol solvent is evaporated on the rotary evaporator under vacuum. The resulting triglyceride product is substantially pure 1-propanoyl-2-acetyl-3-propanoyl glycerol, indicating that the esterification occurs without substantial intramolecular or intermolecular acyl group rearrangement.

Equivalent results are obtained when the ferric chloride is replaced on an equimolar basis with a mixture of ferric and stannic chlorides, a mixture of ferric and zinc chlorides or a mixture of stannic and zinc chlorides.

The procedure is carried out at a catalyst-to-anhydride mole ratio of 0.01:1 with equivalent results.

In the above procedure the acetic anhydride is replaced by an equivalent amount of benzoic acid anhydride and the reaction product is substantially all 1-propanoyl-2-benzoyl-3-propanoyl glycerol, indicating that substantially no ester group rearrangement occurs in the process.

What is claimed is:

1. A process for preparing specific complete mixed polyol esters from partial polyol esters with substantially no ester group rearrangement comprising esterifying a partial polyol ester with an acid anhydride in the presence of an anhydrous catalyst selected from the group consisting of ferric chloride, zinc chloride, stannic chloride and mixtures thereof, said partial polyol ester being selected from the group consisting of partial polyol esters from saturated aliphatic diols having the hydroxyl groups unsymmetrically substituted with respect to the carbon chain and partial polyol esters from saturated aliphatic polyols containing at least three hydroxyl groups.

2. The process of claim 1 which is carried out at temperature from 0° to 212° F.

3. The process of claim 1 which is carried out using a molar excess of the acidic lipid anhydride.

4. The process of claim 1 wherein the partial polyol ester is a partial glyceride ester.

5. The process of claim 1 wherein the partial polyol ester is a 1,3-diglyceride.

6. The process of claim 1 wherein the partial polyol ester is a partial ester of 1,2-propylene glycol.

7. The process of claim 1 wherein the acid anhydride is an alkyl anhydride wherein the alkyl group has from 7 to about 21 carbon atoms.

8. The process of claim 1 wherein the acid anhydride is an alkenyl anhydride wherein the alkenyl group has from 7 to about 21 carbon atoms.

9. The process of claim 1 wherein the acid anhydride is oleic anhydride.

10. The process of claim 1 wherein the partial polyol ester is a monoglyceride and the reaction is carried out in an organic solvent selected from the group consisting of benzene and pyridine.

11. A process for preparing a synthetic cocoa butter comprising acylating the 2-hydroxyl group of 1-palmitoyl-3-stearoyl glycerol with oleic anhydride in the presences of an anhydrous catalyst selected from the group consisting of ferric chloride, zinc chloride, stannic chloride and mixtures thereof, and crystallizing and separating the synthetic cocoa butter thus formed.

12. A process for preparing synthetic cocoa butter comprising: (1) admixing substantially completely hydrogenated palm oil with glycerol in the presence of triacetin and sodium methoxide catalyst; (2) separating and crystallizing the 1,3-diglycerides formed; (3) acylating the 2-hydroxyl groups thereof with oleic anhydride in the presence of an anhydrous catalyst selected from the group consisting of ferric chloride, zinc chloride, stannic chloride and mixtures thereof; and (4) crystallizing and separating the synthetic cocoa butter thus formed.

13. The process of claim 12 wherein the catalyst to oleic anhydride molar ratio is at least 0.001:1.

14. The process of claim 12 which is carried out at from about 0° to about 212° F.

15. The process of claim 12 which is carried out in the presence of a molar excess of oleic anhydride.

16. A process according to claim 1 wherein said anhydride is selected from the group consisting of acidic lipid anhydrides of the structural formula

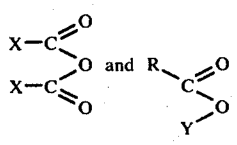

wherein X is a substituent selected from the group consisting of:

1. alkyl and alkenyl groups having from 7 to 21 carbon atoms and having the formula R—
2. residues of alkyl half-esters of a dicarboxylic having the formula

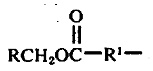

3. residues of monacyl diol half-esters of a dicarboxylic acid having the formula

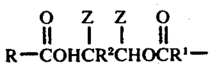

4. residues of diacyl glyceride half-esters of a dicarboxylic acid having the formula

and 5. residues of monoacyl derivatives of a primary monohydroxy monocarboxylic acid having the formula

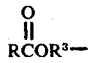

wherein in (1) to (5) above:

R is an alkyl or alkenyl group having 7 to 21 carbon atoms;

$R^1$ is an alkylene group having 2 to 4 carbon atoms;

$R^2$ is an alkylene group having 0 to 4 carbon atoms;

$R^3$ is an alkylene group having 2 to 5 carbon atoms;

Z is a substituent selected from the group of hydrogen and methyl; and

Y is a substituent selected from the group consisting of benzyl, p-nitrobenzyl, and phosphoryl ester; and wherein the ratio of said catalyst to acidic lipid anhydride is at least about 0.001 to 1.

* * * * *

UNITED STATES PATENT AND TRADEMARK OFFICE
CERTIFICATE OF CORRECTION

PATENT NO. : 3,989,728

DATED : November 2, 1976

INVENTOR(S) : James B. Martin

It is certified that error appears in the above-identified patent and that said Letters Patent are hereby corrected as shown below:

Col. 4, line 22. "distearing" should be -- distearin --

Col. 4, line 66, "21 carbon atoms and having the formula" should be -- 21 carbon atoms and having the formula R - --

Col. 5, line 51, "$(R^4O)_2P-O$" should be -- $(R^4O)_2P-O$ --

Col. 15, line 45, "sample," should be -- sample. --

Signed and Sealed this

Eighth Day of March 1977

[SEAL]

*Attest:*

RUTH C. MASON
*Attesting Officer*

C. MARSHALL DANN
*Commissioner of Patents and Trademarks*